United States Patent [19]

Everett

[11] Patent Number: 4,776,772

[45] Date of Patent: Oct. 11, 1988

[54] APPARATUS FOR CONVERTING AND STORING WAVE ENERGY

[76] Inventor: Thomas D. Everett, 1144 E. Washington Blvd., Lombard, Ill. 60148

[21] Appl. No.: 81,411

[22] Filed: Aug. 4, 1987

[51] Int. Cl.⁴ .............................................. F04B 17/00
[52] U.S. Cl. ..................................... 417/333; 60/502
[58] Field of Search ................................. 417/330–333, 417/337; 60/398, 502, 503; 290/42, 53

[56] References Cited

U.S. PATENT DOCUMENTS

| | | | |
|---|---|---|---|
| 1,516,349 | 11/1924 | Rittenhouse | 417/331 |
| 1,523,031 | 1/1925 | Mitchell, Jr. | 417/333 |
| 1,617,571 | 2/1927 | Caldwell | 60/502 |
| 2,871,790 | 2/1959 | Weills | 417/333 |
| 3,250,220 | 5/1966 | Eslinger | 417/333 |
| 3,970,415 | 7/1976 | Widecrantz et al. | 417/332 |
| 4,174,192 | 11/1979 | Daddario | 417/333 |

FOREIGN PATENT DOCUMENTS 165674 10/1982 Japan .................................. 417/332

Primary Examiner—Carlton R. Croyle
Assistant Examiner—Paul F. Neils
Attorney, Agent, or Firm—Olson & Hierl

[57] ABSTRACT

An apparatus converts the naturally occurring energy potential found in waves into a pressurized water source. The apparatus, which can be positioned in a breakwater, is comprised of a float to track the crest and trough of waves, a pump, and mechanics to drive the pump in response to the vertical movement of the float.

6 Claims, 2 Drawing Sheets

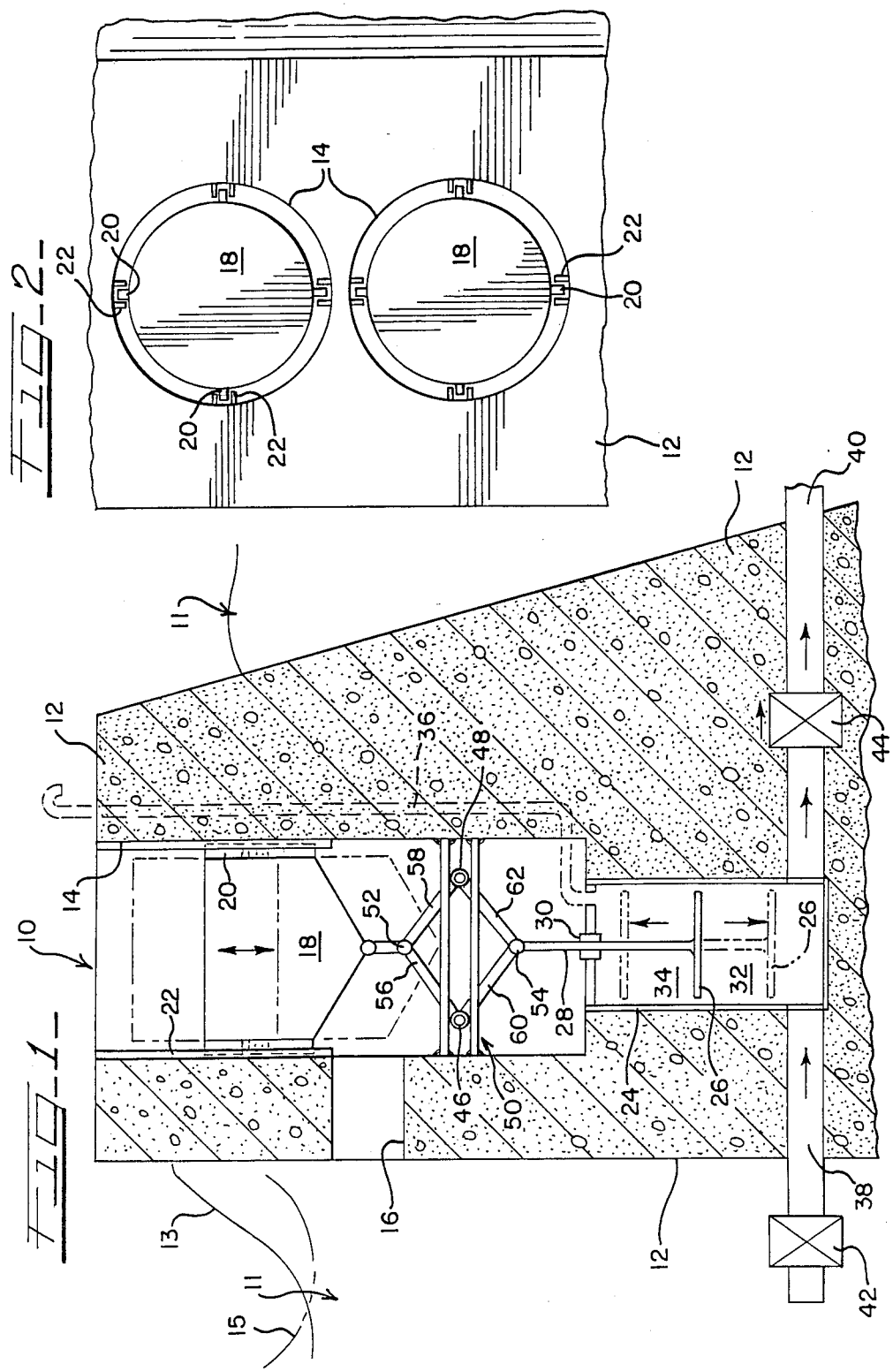

APPARATUS FOR CONVERTING AND STORING WAVE ENERGY

TECHNICAL FIELD

The present invention relates to energy conversion and, in particular, to an apparatus for converting wave energy into a more readily usable form of energy potential.

BACKGROUND OF THE INVENTION

Many types of energy conversion processes are well known today. The conversion of fossil fuels such as coal, oil and natural gas has been utilized for some time. In such fossil fuels, the available energy potential is converted into a form of energy which is more useful to consumers.

More recently, alternative forms of energy potential have been converted into useful forms of energy. Thus, for example, the energy found in atomic particles has been used to drive nuclear reactors; solar energy has been harnessed by heat-sensitive panels to produce heat; and wind energy has been used to drive windmills.

Of particular interest to the present invention is the source of potential energy found in the world's water supply. Attempts have been made to tap such energy potential, most notably the development of hydroelectric power generators in which the energy potential in a water source found at a high altitude is used to drive turbines which in turn produce electrical energy.

All of these known types of energy conversion have disadvantages. The use of fossil fuels pollutes the environment and uses up an ever decreasing resource pool. The use of atomic energy potential is highly dangerous and pollutes the environment in the form of radioactive by-product.

The conversion of solar or wind energy uses a readily available energy potential without the harmful side effects of fossil fuels. However, these conversions also require expensive, cumbersome equipment. Hydroelectric generators are relatively efficient and produce no deleterious byproducts, but the necessary sources of energy potential are scarce.

Thus, the goal of energy conversion is to efficiently convert a readily available source of energy potential into a more useful form of energy in a safe manner.

SUMMARY OF THE INVENTION

The present invention balances the competing interests of energy conversion. The naturally occurring energy potential found in the waves produced in a large body of water is converted into a pressurized water source. This pressurized water source can comprise a useful form of energy potential by, for example, propelling water inland for use in irrigation or in other applications. In addition, the pressurized water source can be converted into a different form of energy potential by, for example, driving a turbine to generate electricity.

In the present invention, means is provided for tracking the crest and trough of waves on a body of water. Through a connecting means, this tracking means drives a pump, and thus converts the energy potential of the waves into mechanical energy potential. The driven pump is used in conjunction with a series of valves and chambers to pump water from the body of water. This pumped water can then be stored in a pressurized chamber for use as described above.

In a preferred embodiment, the housing of the present invention acts as a breakwater to protect the shoreline of the body of water. As added protection to the shoreline, the wave pump can be used to pump water from the breakwater-created harbor to the body of water thereby lowering the water level in the harbor. This function is especially beneficial as the pump will move more water and thus lower the water level in the harbor at a time when the greatest shoreline protection is needed: during a storm. Thus, the readily available source of energy potential in wave energy is converted to a more useful form of energy potential, pressurized water, with no harmful side effects such as pollution.

BRIEF DESCRIPTION OF THE DRAWINGS

FIG. 1 is a cross-sectional elevational view of one embodiment of the present invention;

FIG. 2 is a top view of the embodiment of FIG. 1; and

DETAILED DESCRIPTION OF THE PREFERRED EMBODIMENT

Figure 3:
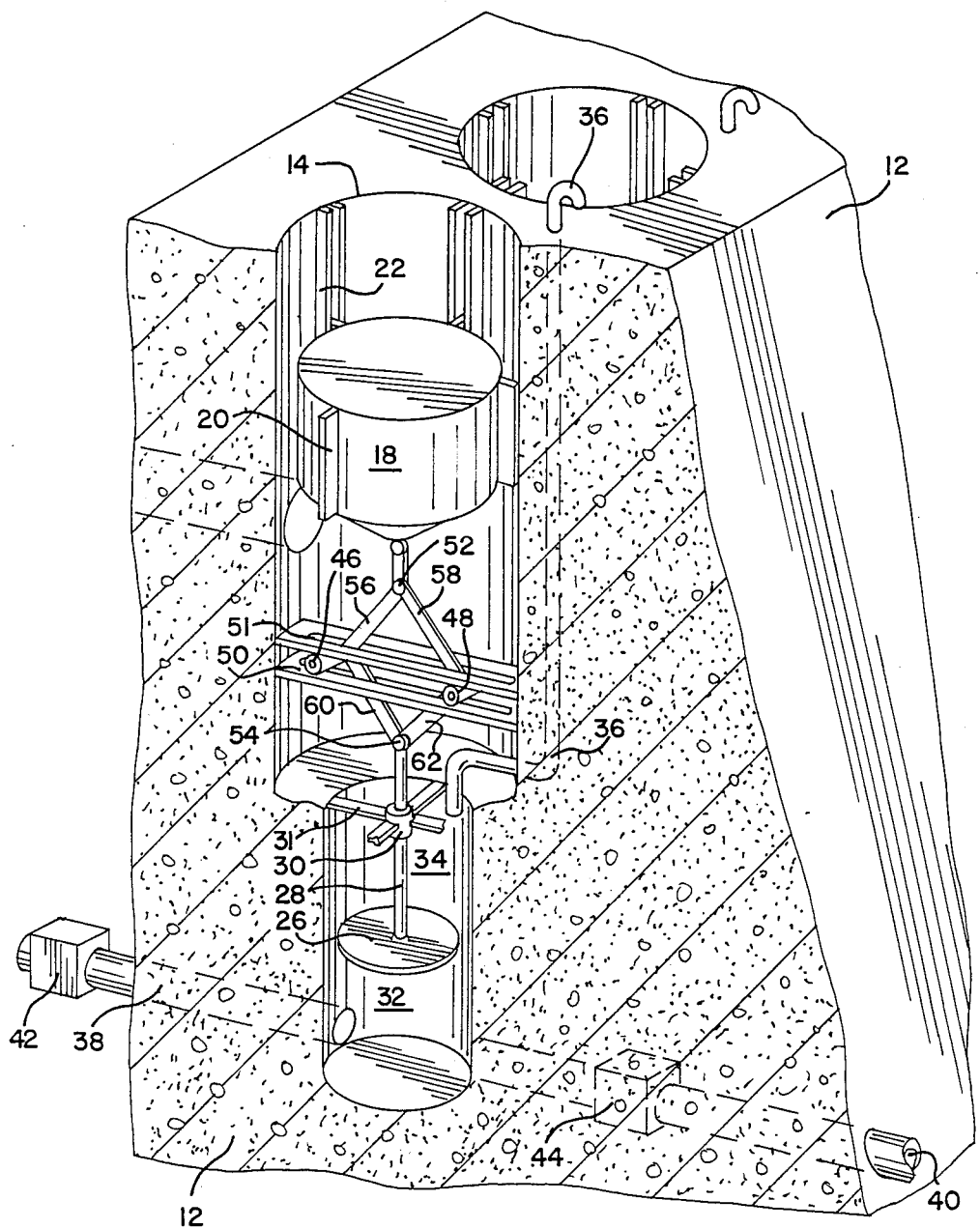
FIG. 3 is a cut-away perspective view of the embodiment of FIG. 1.

Referring to FIG. 1, the wave pump of the present invention is indicated generally by the reference numeral 10. The wave pump 10 includes a housing 12 which in a preferred embodiment is a breakwater partially submerged in a body of water 11. Thus, the breakwater housing 12 defines a man-made harbor to help protect the shoreline of the body of water 11. The housing 12 can be made of any material suitably adapted for use as a breakwater, most notably concrete.

The breakwater housing 12 includes a substantially vertical silo 14 which extends from the top of the breakwtter housing 12 to below the surface level of the body of water 11. For safety, the silo 14 can be protected by the use of a suitable cover (not shown) such as a grating, which allows air to flow through the silo but prevents objects from entering the silo 14.

The breakwater housing 12 further includes at least one inlet port 16. The inlet port 16 is located below the surface level of the body of water 11 and establishes fluid communication between the body of water 11 and the silo 14. Thus, as waves from the body of water 11 strike the breakwater housing 12, the difference in water pressure produced by the crest 13 and trough 15 of the waves is transferred through the inlet port 16 and into the silo 14. This causes the water level in the silo 14 to rise and fall.

A means for tracking the rise and fall of the water level, which in a preferred embodiment comprises a float 18, is slidably mounted for vertical movement within the silo 14. The float 18 is preferably made of a highly buoyant, lightweight material but along with its associated parts must be capable of withstanding the rapid and sometimes violent rise and fall of the water level within the silo during a storm.

The float 18 is restricted to substantially vertical movement by means of a guide comprising a plurality of tongues 20 which extend vertically along the float 18. The tongues 20 slide vertically in corresponding grooves 22 which extend vertically along the interior wall of the silo 14, as shown in FIG. 2.

In a preferred embodiment, the breakwater housing 12 further defines a piston cylinder 24. But in an alternative embodiment, a separate housing may be used. A piston 26 when attached to a piston rod 28 forms a slidable seal with the wall of the piston cylinder 24 thereby separating the piston cylinder 24 into a working chamber 32 and an exhaust chamber 34.

In a preferred embodiment illustrated in FIG. 3, the piston cylinder 24 is open to the silo 14 thus permitting the free flow of the silo water into the exhaust chamber 34. The piston rod 28 is slidably contained in a journal 30 that is supported in the exhaust chamber by rigid arms 31. In a second preferred embodiment, best seen in FIG. 1, the piston cylinder 24 is fluidly isolated from the silo 14 with the journal 30 forming a sliding seal with the piston rod 28. In this embodiment, the exhaust chamber 34 is connected to the atmosphere by an outlet conduit 36 defined in the breakwater housing 12. Thus, the, exhaust chamber 34 is air-filled during operation.

The working chamber 32 of the piston cylinder 24 is in fluid communication with the body of water 11 by means of a first conduit 38 defined in the breakwater housing 12. The working chamber 32 is also in fluid communication with a source of pressurized water (not shown) by means of a second conduit 40 defined in the breakwater housing 12.

A first one way valve 42 in the first conduit 38 separates the working chamber 32 and the body of water 11 while a second one way valve 44 in the second conduit 40 separates the working chamber 32 and the source of pressurized water. Both the first and second one way valves 42 and 44 are normally in the closed position. The first one way valve 42 allows water to flow through the first conduit 38 when the water pressure in the body of water 11 is greater than the water pressure in the working chamber 32, while the second one way valve 44 allows water to flow through the second conduit 40 when the water pressure in the working chamber 32 is greater than the water pressure in the source of pressurized water.

Thus, as the piston 26 is raised and lowered, the water pressure in the working chamber 32 is increased and decreased. When the water pressure in the working chamber 32 is less than the water pressure in the body of water 11 (i.e., on a piston upstroke), the first one way valve 42 allows water to enter the working chamber 32. When the water pressure in the working chamber 32 is greater than the water pressure in the source of pressurized water (i.e., on a piston downstroke), the second one way valve 44 allows water to leave the working chamber 32. After a series of such movements, the water pressure of the source of pressurized water is increased.

Additionally, the pressure developed by the piston 26 is proportional to the force applied by the water in the silo 14 times ($\times$) the cross-sectional area of the piston. The force applied by the water in the silo 14 is proportional to the size of the silo 14. Thus, by adjusting the size of the silo 14 and the cross-sectional area of the piston 26, the pressure developed in the working chamber 32 can be controlled.

In a further embodiment, by connecting the first one way valve 42 of a wave pump 10 to the second one way valve of a respective second wave pump, a series of working chambers 32 can be connected to further increase the water pressure in the source of pressurized water. Also, if the wave pump is being used to help protect the shoreline, the water is extracted from the man-made harbor and deposited into the body of water outside the harbor thereby lowering the water level within the harbor.

The sliding motion of the piston 26 is controlled by the upward and downward movement of the float 18 as it tracks the rise and fall of the water level in the silo 14 as communicated by connection means between the float 18 and the piston rod 28. In the preferred embodiment, this connection means includes a first pivot roller 46 and a second pivot roller 48 positioned in a groove 51 defined in roller housing 50. Attached to the float 18 is a float pivot 52 while attached to the piston rod 28 is a piston pivot 54. The float pivot 52 is connected to the first pivot roller 46 by means of a first rigid arm 56 and to the second pivot roller 48 by means of a second rigid arm 58. Thus, the float pivot 52, the first pivot roller 46, and the second pivot roller 48 form a first triangle with the angle defined by the float pivot 52 and the first pivot roller 46 being equal to the angle defined by the float pivot 52 and the second pivot roller 48.

The piston pivot 54 is connected to the first pivot roller 46 by means of a third rigid arm 60 and to the second pivot roller 48 by means of a fourth rigid arm 62. Again, the piston pivot 54, the first pivot roller 46, and the second pivot roller 48 form a second triangle with the angle defined at the first pivot roller 46 being equal to the angle defined at the second pivot roller 48. Additionally, the size of the angles defined in the two respective triangles at the pivot rollers 46, 48 are directly proportional, as defined by the angle at the float pivot 52 in the first triangle.

In operation, the upward movement of the float 18 causes the angle defined at the float pivot 52 to decrease, thus increasing the angles found in both triangles at the first and second pivot rollers 46 and 48. This results in a decrease in the distance between the first and second pivot rollers 46 and 48 in the roller housing 50. The increase in the angles at the first and second pivot rollers 46 and 48 in the second triangle forces the angle at the piston pivot 54 to decrease. This results in the downward movement of the piston pivot 54 which forces the piston 26 into the working chamber 32. Thus, the piston 26 acts to increase the water pressure in the working chamber 32 when the float 18 is subjected to the greater upward force of the waves.

It should be understood that various modifications, changes and variations may be made in the arrangement, operations and details of construction of the elements disclosed herein without departing from the spirit and scope of the invention.

What is claimed is:

1. An apparatus for use in a body of water for converting wave energy into a source of pressurized water comprising:

a partially submerged housing defining a substantially vertical silo and at least one port establishing fluid communication between the silo and the body of water to allow the crest and trough of the waves in the body of water to raise and lower the water level in the silo;

a vertically displaceable float means contained within the silo for tracking the water level in the silo;

a submerged housing defining a piston cylinder;

a slidable piston sealingly contacting the piston cylinder thereby defining an exhaust chamber and a working chamber;

a float pivot means in mechanical communication with the float means;

a piston pivot means in mechanical communication with the piston;

a roller housing defining a groove;

first and second pivot roller means contained in the groove;

a first rigid arm connecting the float pivot means and the first pivot roller means;

a second rigid arm connecting the float pivot means and the second pivot roller means;

a third rigid arm connecting the piston pivot means and the first pivot roller means;

a fourth rigid arm connecting the piston pivot means and the second pivot roller means;

a normally-closed first one-way valve means in fluid communication with the working chamber and the body of water which allows water to enter the working chamber when the water pressure in the working chamber is less than the water pressure in the body of water; and a normally-closed second one-way valve means in fluid communication with the working chamber and the source of pressurized water which allows water to enter the source of pressurized water when the water pressure in the working chamber is greater than water pressure in the source of pressurized water.

2. The apparatus of claim 1 wherein the partially submerged housing and the submerged housing defining a piston cylinder are the same.

3. The apparatus of claim 1 wherein the exhaust chamber of the piston cylinder is in fluid communication with the silo.

4. The apparatus of claim 1 wherein the exhaust chamber of the piston cylinder is in gaseous communication with the atmosphere.

5. The apparatus of claim 1 wherein the partially submerged housing comprises a breakwater thereby defining a man-made harbor.

6. The apparatus of claim 5 wherein the body of water is the man-made harbor; the source of pressurized water is the body of water outside the man-made harbor; and the port extablishes fluid communication between the silo and the body of water outside the man-made harbor.

* * * * *